United States Patent
Lang

[15] 3,651,885
[45] Mar. 28, 1972

[54] HYDROSTATIC STEERING SYSTEM FOR VEHICLES

[72] Inventor: Armin Lang, Friedrichshafen, Germany
[73] Assignee: Zahnradfabrik Friedrichshafen AG, Friedrichshafen, Germany
[22] Filed: Sept. 15, 1970
[21] Appl. No.: 72,321

[30] Foreign Application Priority Data

Sept. 18, 1969 Germany.....................P 19 47 205.0

[52] U.S. Cl. .............................180/79.2R, 60/52 S, 91/368
[51] Int. Cl. ........................................................B62d 5/06
[58] Field of Search ...................296/79.2 R, 79.2 A, 79.2 B, 296/79.1; 60/52 S; 91/368, 363

[56] References Cited

UNITED STATES PATENTS 2,962,108   11/1960   Bidwell .............................180/79.2 R
3,011,579   12/1961   Milliken et al. ....................180/79.2 R Primary Examiner—Benjamin Hersch
Assistant Examiner—John A. Pekar
Attorney—Zalkind, Horne & Shuster

[57] ABSTRACT

The wheels of a vehicle are turned by fluid power operating devices when pressurized in response to directionally controlled shift of a control valve from a neutral position. The valve is shifted in opposite directions by manual rotation of a hand wheel and in a followup direction by a reversible motor through a self-locking reduction gear drive. Position sensing devices monitor followup movement of the motor and turning movement of the vehicle wheels to control energization of the motor in response to unbalance of a bridge circuit.

7 Claims, 1 Drawing Figure

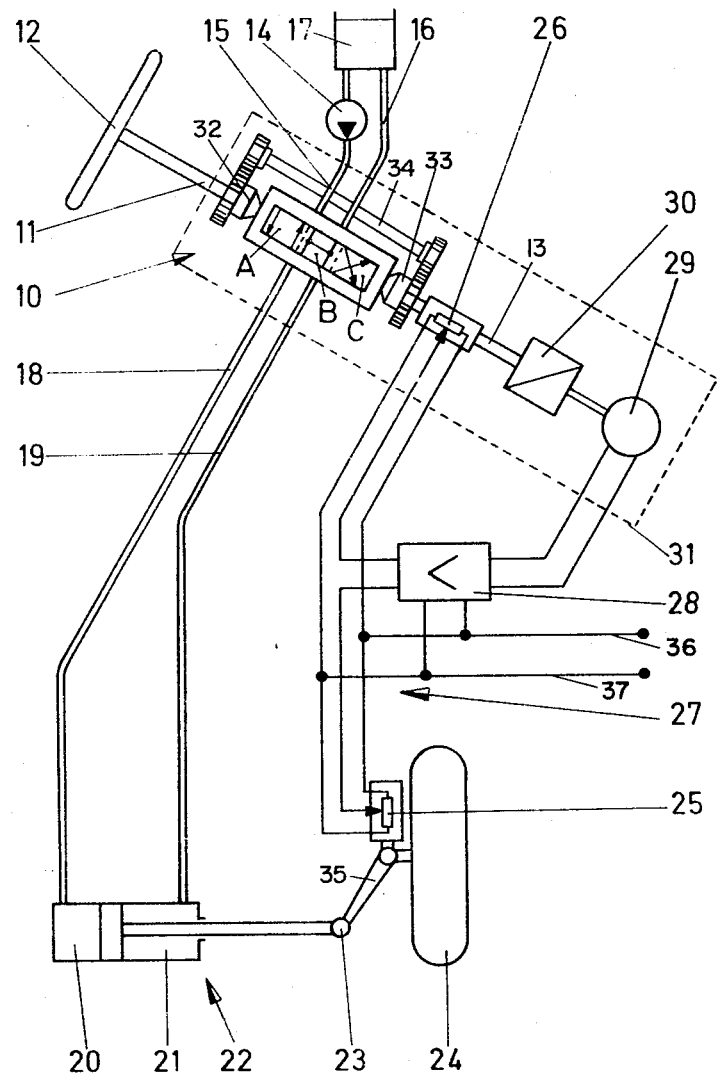

HYDROSTATIC STEERING SYSTEM FOR VEHICLES

This invention relates to a hydrostatic steering system for vehicle wheels and in particular for heavy loaded vehicle steering requiring power operated control.

Most power operated steering control systems utilized for high power installations such as heavy work trucks, employ metering devices or control pumps for the pressure medium in order to maintain synchronization between the vehicle wheels being turned and the hand steering wheel since relatively large volumes of pressure medium must be pumped. Also, because of unequal piston surfaces in available fluid operating devices, special fluid circuits must be provided to equalize turning in opposite direction. Further, the size of these fluid operating devices determines the steering gear ratio and fluid leakage losses affect angular alignment between the vehicle wheels and the steering column.

It is, therefore, an important object of the present invention to provide a less complex steering control system which will nevertheless provide directionally equal deflection of the hand steering wheel despite unequal piston surfaces in the fluid operating devices and maintain precise angular alignment between the steering column and the vehicle wheels being turned. The foregoing object is achieved by the elimination of the metering devices or control pumps normally associated with the type of steering control system referred to, so as to increase the space available adjacent the steering column for hydraulic and electrical control components.

In addition, the steering control system of the present invention may be designed with a steering gear ratio independent of the size of the operating cylinder devices and angular alignment will be maintained despite fluid leakage losses. Also, the advantages of other power operated steering control systems are retained such as follow-up movement without the danger of defective valve control and an emergency operational mode should there be any failure of the synchronizing control means.

Synchronization is achieved in accordance with the present invention by a first sensor monitoring the angular movement of the dirigible wheels of the vehicle and cooperating with a second sensor through a bridge circuit to control operation of a reversible motor through which follow-up movement is imparted to the control valve otherwise shifted by the hand steering wheel. The motor imparts movement to the control valve through a self-locking type of reduction gear assembly and an intermediate shaft, the movement of which is monitored by the second sensor. Valve actuators coupled by torsionally yieldable means drivingly connect the steering spindle and the intermediate shaft to opposite sides of the control valve.

The control valve when shifted from a neutral position, blocks by-pass flow between the pressure supply and return conduits connected to an engine driven servo pump and fluid reservoir to pressurize one of two opposed pressure chambers in the fluid power operating device through which turning movement is imparted to the vehicle wheels.

The drawing schematically illustrates the steering control system of the present invention. In the embodiment shown by way of example, a steering column housing block 31 denoted by dotted line encloses a fluid control distributor valve 10 of any well known type having four ports. The valve is shiftable from its neutral position B as shown in the drawing in opposite directions to positions A and C by rotation of a steering hand wheel 12. A steering spindle 11 connected to the steering wheel 12 is accordingly drivingly connected by any suitable valve actuator 32 to the shiftable valve element associated with valve 10. The valve element is also shiftable in a follow-up direction by rotation of an intermediate shaft 13 through a second valve actuator 33. The steering spindle 11 and intermediate shaft 13 are coupled to each other by any well known torsionally elastic and yieldable driving connection such as the torsion bar 34 shown by way of example.

A fluid medium under pressure is supplied to an inlet port of the valve 10 by a vehicle engine driven servo pump 14 through conduit 15. The fluid medium is conducted from a return port of the valve through conduit 16 to a reservoir 17 connected to the suction side of pump 14. Two outlet ports of the valve are connected by conduits 18 and 19 to opposed pressure chambers 20 and 21 of at least one piston-cylinder operating device 22 in a closed fluid circuit as shown. The piston rod of the operating device is connected through a linkage system 23 to the spindle arms 35 associated with the dirigible wheels 24 of the vehicle, only one of the wheels 24 being shown in the drawing. It will be apparent that in the neutral position of the valve, there is no build up of operating pressure in the operating device 22 since an unrestricted by-pass connection is established between the inlet and return conduits 15 and 16 permitting recirculation of the fluid medium. However, in either of positions A and C, the outlet conduits 18 and 19 are connected to the inlet and return conduits 15 and 16 without any fluid by-pass so as to pressurize one of the chambers 20 and 21 to effect displacement of the piston and turning of the wheel 24 through the linkage system 23 and spindle arms 35.

A position sensing device 25 is driven by the spindle arm of the dirigible wheel 24 in order to monitor angular movement of the wheel. Alternatively, the sensing device could be associated with the fluid operating device 22 in order to monitor movement of the piston, which is proportional to the turning movement of the wheels 24. A second sensing device 26 is driven without slippage by the intermediate shaft 13 in order to register the angular position thereof. These sensing devices may be in the form of adjustable potentiometers or variable inductance means. Also, the sensing devices 25 and 26 form branches of a measuring bridge circuit 27 which produces a signal voltage when unbalanced by relative variations in the impedances of the sensing devices. The signal voltage developed by the bridge circuit is fed to an amplifier 28 having a linear gain characteristic in order to supply an amplified operating voltage to a reversible electric motor 29. Thus, the motor 29 will rotate in opposite directions and at a speed dependent upon the magnitude and polarity of the signal voltage output of the bridge circuit. Electrical energy is supplied to the bridge circuit for this purpose through power lines 36 and 37.

The motor 29 shown enclosed within the housing block 31, is connected to the input side of a reduction drive ratio gear assembly 30 of the self-locking type. The output side of the gear assembly is connected to intermediate shaft 13 so as to impart rotation thereto at a low speed and in a rotational direction for follow-up movement with respect to steering spindle 11. Because of the self-locking nature of gear assembly 30, intermediate shaft 13 will be held stationary while torque is being transmitted in one direction from steering spindle 11 to valve actuator 32. Torque is transmitted through intermediate shaft 13 to valve actuator 33 only when originating from motor 29. The gear assembly 30 may also be combined with valve 10 and motor 29 as one unit enclosed in the housing block 31. Further, it will be apparent that the gear assembly does not affect the steering gear ratio.

From the foregoing description, operation of the steering system will become apparent. When a turning motion is imparted in one direction to steering spindle 11 by hand wheel 12, against the bias of torsion bar 34 initially anchored by intermediate shaft 13, the valve 10 is shifted in a corresponding direction. Pressure build up will accordingly occur in the operating device 22 at a rate dependent upon road resistance to turning of wheels 24 resulting in the turning of said wheels. The sensing device 25 will simultaneously cause unbalance of the bridge circuit 27 to supply signal voltage to amplifier 28 to energize motor 29. The motor will then drive shaft 13 through gearing 30 in a follow up direction and sensing device 26 will be varied until balance is restored in the bridge circuit. By firmly holding the hand wheel 12 in a deflected or turned position, the wheels 24 will also be held in deflected positions since any tendency of road resistance to change the deflected position of the wheels would produce unbalance in the bridge circuit causing shift of the valve 10 from the neutral position and throttling of by-pass flow therethrough resulting in sufficient pressurization in operating device 22 to prevent return of the deflected wheels 24. Since the motor 29 is stopped when wheel deflection is completed and a balance condition of the bridge circuit exists, no torque will be transmitted to the hand wheel 12 requiring a greater holding effort on the part of the operator, because of the self-locking nature of gearing 30.

Inasmuch as there is no fluid locking of the operating device 22 in the neutral position of valve 10, the wheels 24 may be angularly displaced by lateral roadbed thrust, for example, which is detected by the sensing device 25 to unbalance the bridge circuit and transmit torque to hand wheel 12 through torsion bar 34 for synchronous movement thereof until balance is restored by sensing device 26 without shift of the valve 10. However, if the hand wheel is firmly held, then movement of the shaft 13 relative to steering spindle 11 causes shift of the valve 10 in such a direction as to cause the operating device 22 to oppose the thrust originating from the roadbed.

Although the electrical components of the system effect synchronization between the hand wheel 12 and wheels 24 through shaft 13 as hereinbefore described, should this synchronization be removed because of electrical failure, the steering system will still operate in an emergency mode because the shaft 13 will then be locked by gearing 30. The valve 10 may be shifted in both directions in this operational mode limited by the steering play between the two valve actuators 32 and 33.

What is claimed is:

1. In a hydrostatic steering control system having a source of pressurized operating medium, at least one power operating device, a control valve through which the medium is supplied to the power operating device and manual actuating means operatively connected to the control valve, follow-up means for maintaining alignment between the manual actuating means and the power operating device, comprising a reversible motor, drive means operatively connecting the motor to the control valve for imparting follow-up movement thereto, a pair of sensing devices respectively driven by the power operating device and the drive means for monitoring movements thereof, and bridge circuit means connected to said sensing devices for controlling operation of the motor in response to relative movement of said power operating device and the drive means.

2. The system of claim 1, wherein said drive means includes a self-locking, reduction drive assembly.

3. The system of claim 2, wherein said power operating device is connected by the control valve to the source in a closed fluid circuit, said valve being shiftable from a neutral recirculating flow position to flow blocking positions causing pressurization of the operating device.

4. The system of claim 3, including torsionally yieldable means coupling the manual actuating means and the drive means.

5. The system of claim 2, including torsionally yieldable means coupling the manual actuating means and the drive means.

6. The system of claim 1, including torsionally yieldable means coupling the manual actuating means and the drive means.

7. The system of claim 6, wherein said power operating device is connected by the control valve to the source in a closed fluid circuit, said valve being shiftable from a neutral recirculating flow position to flow blocking positions causing pressurization of the operating device.

* * * * *